United States Patent [19]

Clark

[11] Patent Number: 4,536,714
[45] Date of Patent: Aug. 20, 1985

[54] SHIELDS FOR ANTENNAS OF BOREHOLE LOGGING DEVICES

[75] Inventor: Brian Clark, Ridgefield, Conn.

[73] Assignee: Schlumberger Technology Corporation, New York, N.Y.

[21] Appl. No.: 368,922

[22] Filed: Apr. 16, 1982

[51] Int. Cl.³ .......................... G01V 3/30; H01Q 1/52
[52] U.S. Cl. .................. 324/338; 336/84 R; 343/841
[58] Field of Search .................. 324/338–342, 324/346; 343/841, 885; 336/84 R, 84 G, 84 M

[56] References Cited

U.S. PATENT DOCUMENTS

| | | |
|---|---|---|
| 1,652,227 | 12/1927 | Zuschlag . |
| 1,747,983 | 2/1930 | McCarthy . |
| 2,018,080 | 10/1935 | Martienssen . |
| 2,623,923 | 12/1952 | Zimmerman . |
| 2,722,657 | 11/1955 | Janssen . |
| 2,757,738 | 8/1956 | Ritchey . |
| 2,964,698 | 12/1960 | Lehmberg .................... 324/339 |
| 3,094,658 | 6/1963 | Bravenec et al. ............. 324/339 |
| 3,114,875 | 12/1963 | Haagensen . |
| 3,411,111 | 11/1968 | Meyers . |
| 4,209,747 | 6/1980 | Huchital ........................ 324/338 |
| 4,319,191 | 3/1982 | Meador et al. ................ 324/341 |

FOREIGN PATENT DOCUMENTS 0280698  1/1971  U.S.S.R. .................. 324/339

Primary Examiner—Gerard R. Strecker
Attorney, Agent, or Firm—Stephen L. Borst; Martin M. Novack

[57] ABSTRACT

The disclosed invention is suited for use in conjunction with a borehole logging device wherein transmitting and receiving antenna coils are wound on insulating media around the axis of a support means that includes an elongated electrically conductive pipe. In accordance with the invention there is provided a shield for shielding each coil of the device, the shield being adapted to reduce spurious electromagnetic field components (especially transverse magnetic components) while not substantially interfering with the desirable transverse electric components. The shield for each coil comprises a hollow closed-end cylinder mounted on the pipe and surrounding the coil, the cylinder being formed of an electrically conductive material and having a series of equally spaced slots therein. Each slot extends radially outward from the support means along a plane which passes substantially through the axis of the pipe so as to pass through the ends and sides of the cylinder. The defined slots in the cylinder thereby form a series of elongated cylindrical side sections, each of which is joined to the pipe by a pair of opposing end sectors.

32 Claims, 3 Drawing Figures

SHIELDS FOR ANTENNAS OF BOREHOLE LOGGING DEVICES

BACKGROUND OF THE INVENTION

This invention relates to borehole logging devices of the type wherein electromagnetic energy is used for measuring properties of formations surrounding a borehole and, more particularly, to an improved antenna shield for use in such devices to reduce the effect of spurious modes of the electromagnetic energy.

Induction logging has been employed for many years for measuring the conductivity of subsurface earth formations surrounding an earth borehole. In conventional induction logging a number of coils are wound on a mandrel. One or more transmitter coils are energized by an alternating current at a frequency such as 20 KHz. The resultant oscillating magnetic field causes induction of circulating currents in the formations which are substantially proportional to its conductivity. These currents, in turn, cause a voltage to be induced in receiver coils, and the conductivity of the formations is determined from the induced voltage.

Shields have been employed in the prior art in conjunction with induction logging devices for purposes such as the reduction of the effects of electrostatic coupling between the formations (or borehole fluid) and the coil being shielded.

For example, in U.S. Pat. No. 2,623,923 there is disclosed a shield that has a number of conductor wires parallel to the axis of the borehole and enclosing the antenna coil, the wires being open at one end and terminating at the other end in a common split-ring conductor. This construction prevents completed current paths in the shield. Another type of known induction logging shield employs a structure similar to that just described, but with the wires being replaced by thin strips on a "printed circuit" type of sheet that is wrapped around the induction logging antenna. These types of shields can be useful in a number of induction logging applications. However, existing shielding techniques are inadequate for the special problems that are encountered in the type of logging device to be described.

In recent years logging systems have been proposed for employing radio frequency electromagnetic energy in the range between about 10 MHz and 100 MHz to determine both the dielectric constant and the conductivity of formations surrounding a borehole. In this frequency range, dielectric constant and conductivity both have a substantial effect upon the propagation constant of electromagnetic energy propagating in the formations, so measurements of attenuation and phase can be used for solution of simultaneous equations to determine the dielectric constant and/or conductivity of formations through which the electromagnetic energy has passed. A device of this type is the deep propagation tool ("DPT"), an embodiment of which is described in U.S. Pat. No. 4,209,747. This device includes a transmitting antenna, a "close" receiver antenna pair, and a "far" receiver antenna pair. Each of the transmitter and receiver antennas are coils wound in insulating media mounted on a metal cylindrical pipe which carries wiring to and/or from the coils. Briefly, operation of the DPT logging device involves energizing the transmitter to emit electromagnetic energy at a frequency suitable for determination of both the electrical conductivity and the electrical permittivity of the surrounding formations. A portion of the electromagnetic energy which has traveled through the formations is received at the close and far differential receiver pairs. The signals detected at the far receiver pair are used to determine the phase shift of electromagnetic energy that has passed through the formations, and the signals detected at the close receiver pair are used to determine relative attenuation of the electromagnetic energy. The phase shift and attenuation are then employed to obtain electrical permittivity and electrical conductivity of the formations.

The relatively high frequency electromagnetic energy that is used to obtain the substantial displacement currents needed to measure dielectric properties of the formations attenuates quickly as it travels through the formations. The receivers are typically spaced a substantial distance from the transmitter to attain a significant depth of investigation into the formations. Accordingly, the signal levels received at the receivers (particularly the far receiver pair) tend to be weak, especially in relatively conductive (lossy) formations. Since it is necessary to obtain accurate measurements of the relative attenuation and phase at the receivers, it is desirable to have the signal-to-noise ratio at said receivers be as high as possible. When the received signal is weak, however, as is often the case, the amount of spurious or interfering signal (i.e., "noise") is a limiting factor on the measurement accuracy of the logging device.

There are various phenomena which cause noise at the receivers, but applicant has discovered that there is an important interfering signal in a DPT type of logging device resulting from electromagnetic energy that propagates in the region between the central metal pipe of the device and the borehole fluid of the formations. The energy that propagates in this region has a predominant transverse magnetic component that can be envisioned as propagating in a coaxial type of transmission line. To picture this mode of propagation, the metal cylindrical pipe of the logging device can be thought of as the central conductor of a coaxial line, and the borehole fluid can be thought of as the outer cylindrical conductor of the coax. The region in which the wave propagation takes place is roughly analagous to the air-filled or dielectric-filled region of a coaxial transmission line. [If the borehole fluid is not very conductive (for example, a fresh water-based mud or an oil-based mud), the formations may be thought of as constituting the outer conductor in the coaxial transmission line model.] If the central pipe and the drilling fluid were perfect conductors, the electromagnetic energy propagating in the region therebetween would be a transverse electromagnetic ("TEM") mode wave having a radial electric field and an azimuthal magnetic field. Depending upon the relative conductivity of the outer "conductor" in the coaxial transmission line model (i.e., the borehole fluid, the mudcake, or the formations, as the case may be), the propagating noise mode may comprise another type of electromagnetic wave also having a predominant transverse magnetic component; i.e., a transverse magnetic ("TM") mode electromagnetic wave that includes both radial and axial electric field components, and an azimuthal magnetic field component. The propagating noise modes having a predominant transverse magnetic component (i.e., both the TEM and the TM type modes) will be referred to herein as transverse magnetic modes or components.

If the transmitter and receiver coils were perfectly configured and balanced in a theoretically ideal system, the electromagnetic wave energy generated by the coils would be transverse electric ("TE") mode, of the type generated by an ideal vertical magnetic dipole. However, under actual operating circumstances there is sufficient misalignment, unbalance, or other conditions that give rise to significant undesired transverse magnetic mode. As described hereinabove, the logging device itself in the borehole can act as a coaxial transmission line for transverse magnetic wave energy which can thereby propagate relatively unattenuated between the transmitter and the receivers.

It is an object of the present invention to improve operation in the described type of logging devices, and in induction logging devices in general, by substantially reducing the transmission and/or reception of spurious signals such as transverse magnetic mode noise.

SUMMARY OF THE INVENTION

The present invention is suited for use in conjunction with a borehole logging device wherein transmitting and receiving antenna coils are wound on insulating media around the axis of a support means that includes an elongated electrically conductive pipe. In accordance with the invention there is provided a shield for shielding a coil of said device, the shield being adapted to reduce spurious electromagnetic field components (especially transverse magnetic components) while not substantially interfering with the desirable transverse electric components. Preferably, a shield in accordance with the invention is used in conjunction with each coil of the logging device.

In accordance with the invention, the shield for each coil comprises a hollow closed-ended body mounted on said pipe and surrounding the coil, the body being formed of an electrically conductive material and having a series of substantially equally spaced slots therein. The body is generally in the shape of a surface of revolution. A cylinder is preferred, although other shapes, such as an ellipsoid of revolution surrounding the coil, can be employed. Each slot extends radially outward from the support means along a plane which passes substantialy through the axis of the pipe so as to pass through the ends and sides of the body. When a cylinder is employed, the slots in the cylinder form a series of elongated cylindrical side sections, each of which is joined to the pipe by a pair of opposing end sectors.

In the preferred embodiment of the invention, the thickness of the conductive material of the body is greater than three skin depths of electromagnetic energy at the frequency of operation of the device.

The disclosed configuration allows desired magnetic dipole radiation (from the coil within) to pass through the shield, but the transverse magnetic mode is substantially prevented from passing through the shield, either from within (in the case of the transmitter) or from without (in the case of the receivers). In particular, it will be understood that the azimuthal electric field component (i.e., the transverse electric mode characteristic of the vertical magnetic dipole) will not have a continuous current path in the shield. However, radial and axial electric field components (i.e., the undesired transverse magnetic mode) will tend to be shorted in a closed path that includes the conductive pipe.

Further features and advantages of the invention will become more readily apparent from the following detailed description when taken in conjunction with the accompanying drawings.

DESCRIPTION OF THE PREFERRED EMBODIMENT

Figure 1:
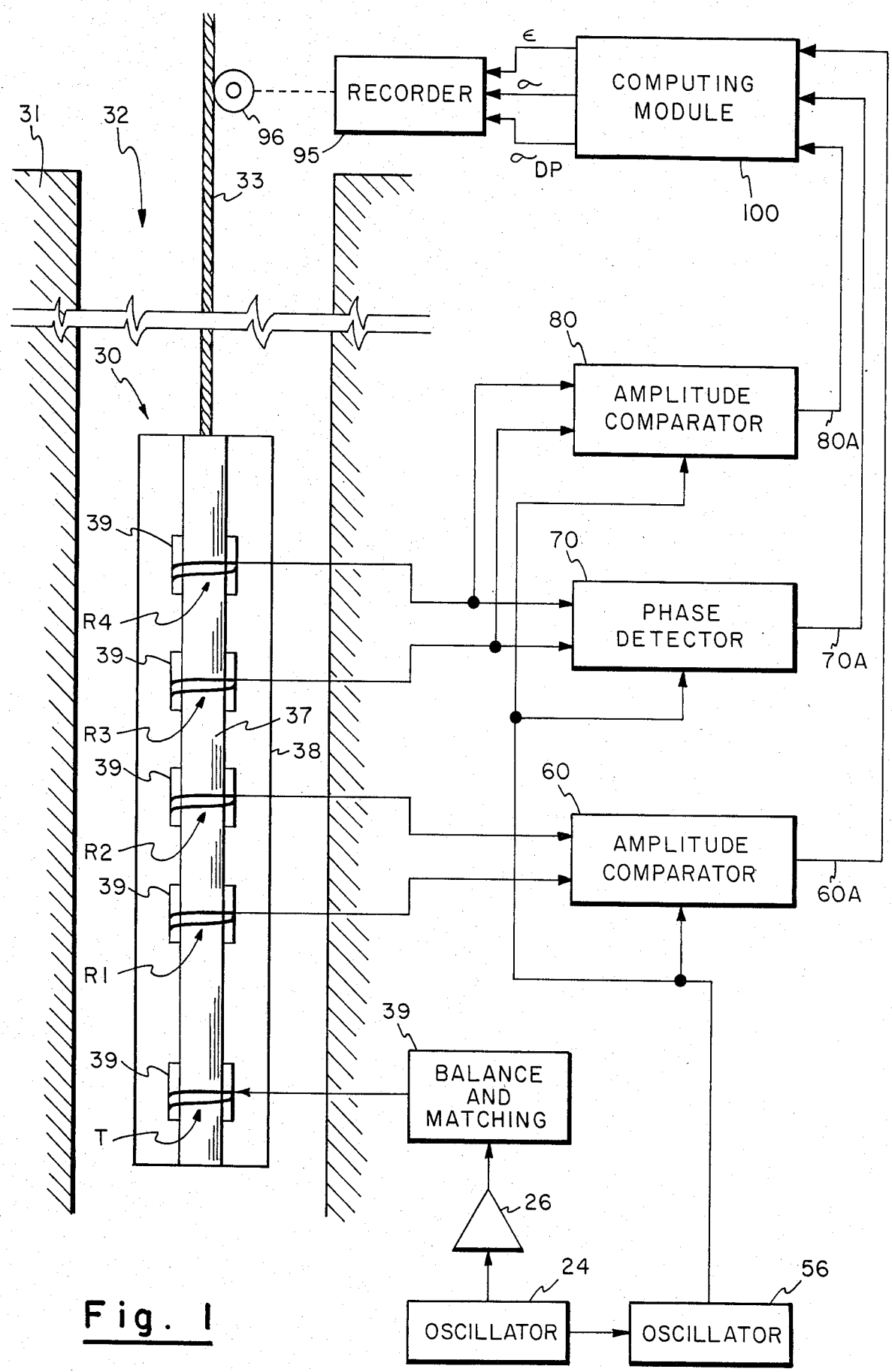
FIG. 1 is a block diagram, partially in schematic form, of a prior art apparatus of a type in which the improvement of the present invention can be employed.

Referring to FIG. 1, there is shown a representative embodiment of a prior art apparatus for investigating subsurface formations 31 traversed by a borehole 32. The borehole 32 may be filled with air or, more typically, drilling mud which may be either water-based mud or oil-based mud. Also, the borehole may be open or cased with a nonconductive material. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The armored cable 33 is rewound on the drum to raise the device 30 toward the surface as formation characteristics are measured. Depth measurements are provided by a measure wheel 96 which is rotated as a result of contact with cable 33. Pulses provided by rotation of measure wheel 96 are applied to a recorder to provide a record of the depths at which measurements are being taken.

The logging device 30 is generally of the type described in U.S. Pat. No. 4,209,747 in that it includes a transmitter coil T, a pair of "close" receiver coils $R_1$ and $R_2$, and a pair of "far" receiver coils $R_3$ and $R_4$. The coils are wound in ceramic media 39 that is mounted on a metal cylindrical pipe 37 that carries wires to and/or from the coils and may also contain electronic components of the logging device. The pipe 37 helps prevent interference at the coils from the wires and/or components therein. An outer insulating pressure-tight housing 38 contains the portions of the device already described.

The transmitter T is driven by a circuit which includes an oscillator 24 that generates a radio frequency signal in the range of 10 MHz–100 MHz. The output of oscillator 24 is amplified by amplifier 26 and then coupled to the transmitter T via a balance and matching network 39. An oscillator 56, which is synchronized with oscillator 24, provides an output signal having a frequency which differs from the frequency of signals provided by oscillator 24 by a relatively low frequency. The output of oscillator 56 is mixed with the signals from the receivers to generate a further signal having a phase and amplitude related to the phase and amplitude of the receiver outputs but a much lower frequency which simplifies the amplitude and phase detection operations.

An amplitude comparator circuit 60 functions to measure the relative attenuation of electromagnetic wave energy detected at the receivers $R_1$ and $R_2$ and provides an amplitude ratio signal ($A_2/A_1$), where $A_2$ and $A_1$ are peak amplitudes sensed at the receivers $R_2$ and $R_1$ respectively. A phase detector circuit 70 functions to measure the difference in phase between electromagnetic waves detected at receivers $R_3$ and $R_4$. The outputs of receivers $R_3$ and $R_4$ may also be applied to a second amplitude comparator circuit 80 which is used in deriving an "ultra-deep conductivity" measurement.

For ease of illustration, the described transmitter and receiver circuitry are illustrated as being set apart from device 30, although such circuitry is generally located within the logging device. The circuitry is electrically coupled to surface instrumentation, including a computing module 100, through conductors 60A, 70A and 80A which are included within the armored cable 33.

The computing module 100 combines the relative attenuation signal provided by amplitude comparator 60 and the phase difference signal provided by phase detector 70 to derive dielectric constant and conductivity values for the formation at a particular depth of investigation in the surrounding formation. Also, the output signal of amplitude comparator 80 can be combined with the derived dielectric constant value to obtain an ultra-deep conductivity value for the formations. The calculated values of dielectric constant and conductivity are applied to a recorder 95 which also receives depth indicating signals from the measure wheel 96. The recorder 95 provides a log of dielectric constant values and conductivity values for the formations surrounding the borehole as a function of depth.

Figure 2:
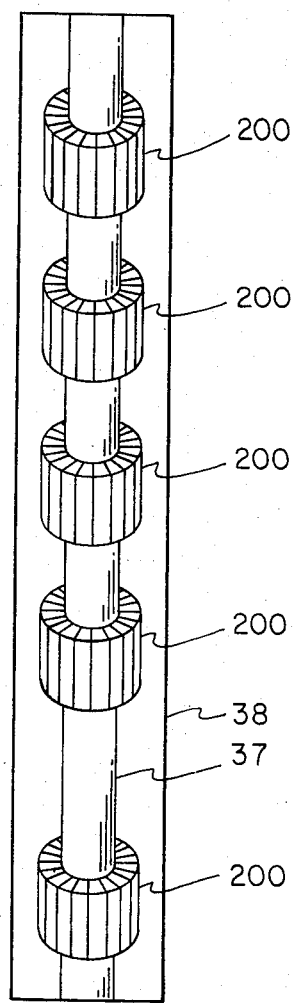
FIG. 2 illustrates the logging device of FIG. 1, but including antenna shields in accordance with an embodiment of the invention.

FIG. 2 illustrates the logging device 30 of FIG. 1, but including shields 200, in accordance with the invention, surrounding each transmitter and receiver coil. Each shield is mounted on the central pipe contained within the pressure-tight housing 38.

The spurious modes that propagate within the logging device of FIG. 1 can be visualized by comparing the device in a borehole to a coaxial transmission line. The central metallic pipe 37 of the device, which houses cables and, if desired, electronic circuitry, acts like the center conductor of a coaxial transmission line, and the conductive borehole mud and/or formation act like the outer conductor. Since the pressure housing 38 defines an electrically insulating enclosure, it can be considered as analogous to the dielectric filling of the coax. As a result, the device/borehole system supports a set of electromagnetic modes similar to those of a coaxial transmission line.

From the known results for this transmission line model, only the axially-symmetric, transverse-magnetic (TM) modes can be expected to propagate. These modes have an azimuthal magnetic field and an electric field with both radial and axial components (in contrast to the magnetic dipole field which has an azimuthal electric field and a magnetic field with radial and axial components). The modes can be expected to propagate along the tool with a propagation constant h that varies from mode to mode. The mode propagation constant h can be evaluated by solving a complex transcendental equation. (For a general discussion of modes, see "Field Theory of Guided Waves" by R. E. Collin (McGraw-Hill).) Approximate analytical and exact numerical techniques for solving the equation have shown that there are two distinct types of TM modes, the principal mode and the secondary modes. The propagation constant of the secondary modes is given approximately by $$h = \left[ k_o^2 - \left( \frac{N\pi}{b-a} \right)^2 \right]^{\frac{1}{2}}$$

for N=1,2,3, ... where a,b are respectively the radii of the pipe 37 and pressure housing 38 and $k_o$ is the propagation constant in air. Since $\pi/(b-a)$ is much larger than $k_o$ in the device, h is a purely imaginary number for all N, and all secondary modes attenuate very strongly along the tool axis. (The modes are said to be cut off.) The secondary modes, therefore, should not meaningfully affect device performance.

The principal mode is not cut off at any frequency. Its propagation constant is close to $k_o$, with somewhat larger real and imaginary parts. Hence, the mode propagates with very low loss. The field components of this mode within the pressure housing 38 are given approximately by $$H_\phi = \frac{Ak_o^2}{\mu_o \omega r} \exp[i(hz - \omega t)],$$

$$E_r = -\frac{Ah}{r} \exp[i(hz - \omega t)],$$

$$E_z = iA(k_o^2 - h^2) \ln\left(\frac{r}{a}\right) \exp[i(hz - \omega t)]$$

where (r,φ,z) are cylindrical coordinates with axis along the tool axis, ω is the angular frequency of the device, t is time, $\mu_o$ is the magnetic permeability of air, and A is an arbitrary constant. Since $k_o^2 - h^2$ is very small, the axial component of the electric field is much smaller than the radial component. In the limit as the conductivity of the outer medium tends to infinity, h approaches $k_o$ and the mode becomes the transverse electric and magnetic (TEM) mode present in a perfect coaxial transmission line.

Since the principal mode is essentially lossless, it is important that such mode not be substantially propagated from the transmitter, nor detected by the receivers. The shields of the present invention are highly useful for this purpose.

Figure 3:
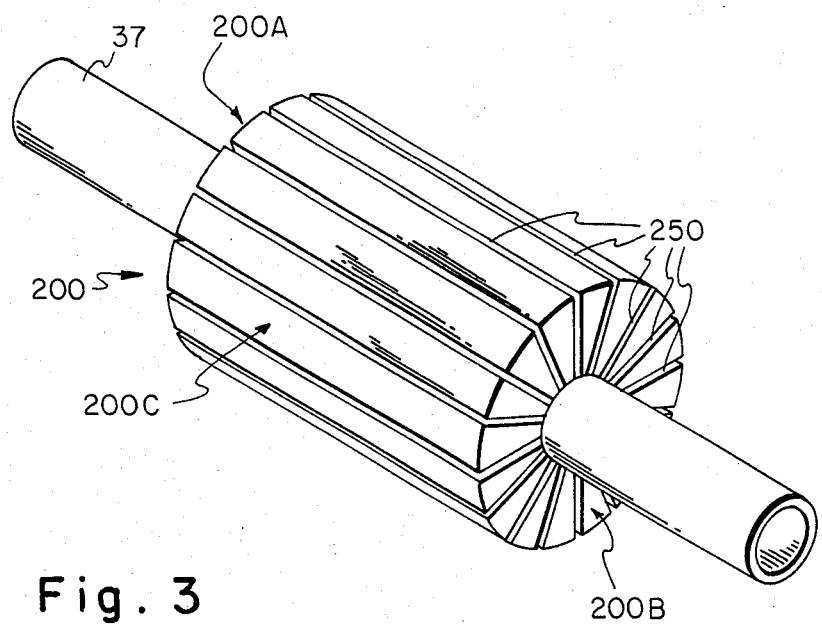
FIG. 3 illustrates one of the antenna shields of FIG. 2.

Referring to FIG. 3 there is shown one of the shields 200 in accordance with the present embodiment of the invention. A hollow closed-end cylinder 200 is formed of a conductive metal and has apertures at its ends through which pipe 37 passes. The pipe contacts the cylinder at the periphery of these apertures. The cylinder 200 has a series of substantially equally spaced slots 250 therein. Each slot extends radially outwardly from the pipe 37 along a plane which passes through the axis of the pipe, so that the plane of each slot is like a radial fin on the pipe 37. Each slot accordingly passes through both ends (200A and 200B) and the side (200C) of cylinder 200. In the present embodiment there are sixteen slots which divide the cylinder 200 into sixteen portions. This configuration allows the desired magnetic dipole radiation (from the coil within) to pass through the shield, but the transverse magnetic mode is substantially prevented from passing through the shield, either from within (in the case of the transmitter) or from without (in the case of the receivers). In particular, it will be understood that an azimuthal electric field component (i.e., the transverse electric mode characteristic of the vertical magnetic dipole) will not have a continuous current path in the shield. However, radial and axial electric field components (i.e., the undesired transverse magnetic mode) will tend to be shorted in a closed path that includes the metal pipe 37. Also, the azimuthal magnetic field (which can also be envisioned as an axial current in the center conductor pipe) is provided with a low resistance current path through the shield, rather than the undesirable current loop through the pipe and the formations.

An advantage of the shield structure of the present embodiment is the absence of substantial interference with the desired (TE) electromagnetic field pattern by virtue of the slotted cylinder ends 200A and 200B. Similar advantages accrue for other surfaces of revolution which terminate at the central conductive pipe. Further, it will be understood that the number of slots 250 should be sufficient to allow the desired uniform field pattern, while still allowing mechanical integrity of the structure. A number of slots between four and thirty-two is preferred, there being sixteen slots in the embodiment of FIG. 3.

The conductive shield body material should be sufficiently thick to cause attenuation of spurious mode noise below the level at which it causes problems. In this regard, the shield body thickness should preferably be greater than three skin depths of electromagnetic energy at the frequency of operation of the logging device.

The shields of the present embodiment can be made, for example, by machining the described slots into a closed-end metal cylinder. If desired, one end portion can be formed separately and subsequently be secured to the rest of the structure after assembly over the coil being shielded.

I claim:

1. For use in conjunction with a borehole logging device wherein transmitting and receiving antennas, which transmit or receive electromagnetic energy having transverse magnetic components and transverse electric components, are mounted on a support means which includes a central electrically conductive pipe; a shield for an antenna of said device, comprising:
a hollow closed-ended body joined at its ends to the electrically conductive pipe of said support means and surrounding said antenna, said body being formed of an electrically conductive material generally in the shape of a surface of revolution and having a series of substantially equally spaced slots therein, each slot extending radially outward from said support means along a plane which passes substantially through the axis of said support means, so as to divide said body into a number of conductive sections each of which forms a closed conductive path with said conductive pipe, whereby said conductive paths are operative to prevent passage of transverse magnetic components through said shield, but to allow transverse electric components through the slots of said shield.

2. The shield as defined by claim 1, wherein said body is cylindrically shaped and each slot extends through the ends and side of the cylindrical body.

3. The shield as defined by claim 1, wherein said series of slots comprises between four and thirty-two slots.

4. The shield as defined by claim 2, wherein said series of slots comprises between four and thirty-two slots.

5. The shield as defined by claim 1, wherein the thickness of the conductive material of said body is greater than three skin depths of electromagnetic energy at the frequency of operation of the transmitting antenna.

6. The shield as defined by claim 2, wherein the thickness of the conductive material of said body is greater than three skin depths of electromagnetic energy at the frequency of operation of the transmitting antenna.

7. The shield as defined by claim 3, wherein the thickness of the conductive material of said body is greater than three skin depths of electromagnetic energy at the frequency of operation of the transmitting antenna.

8. The shield as defined by claim 4, wherein the thickness of the conductive material of said body is greater than three skin depths of electromagnetic energy at the frequency of operation of the transmitting antenna.

9. For use in conjunction with a borehole logging device wherein transmitting and receiving coils, which transmit or receive electromagnetic energy having transverse magnetic components and transverse electric components, are wound on insulating media around the axis of a support means that includes an elongated electrically conductive pipe; a shield for use in conjunction with a coil of the device, comprising:
a hollow closed-ended body joined at its ends to said pipe and surrounding said coil, said body being formed of an electrically conductive material generally in the shape of a surface of revolution and having a series of substantially equally spaced slots therein, each slot extending radially outward from said support means along a plane which passes substantially through the axis of said support means, so as to divide said body into a number of conductive sections each of which forms a closed conductive path with said conductive pipe, whereby said conductive paths are operative to prevent passage of transverse magnetic components through said shield, but to allow transverse electric components through the slots of said shield.

10. The shield as defined by claim 1, wherein said body is cylindrically shaped and each slot extends through the ends and side of the cylindrical body.

11. The shield as defined by claim 9, wherein said series of slots comprises between four and thirty-two slots.

12. The shield as defined by claim 10, wherein said series of slots comprises between four and thiry-two slots.

13. The shield as defined by claim 9, wherein the thickness of the conductive material of said body is greater than three skin depths of electromagnetic energy at the frequency of operation of the transmitting coil.

14. The shield as defined by claim 10, wherein the thickness of the conductive material of said body is greater than three skin depths of electromagnetic energy at the frequency of operation of the transmitting coil.

15. The shield as defined by claim 11, wherein the thickness of the conductive material of said body is greater than three skin depths of electromagnetic energy at the frequency of operation of the transmitting coil.

16. The shield as defined by claim 12, wherein the thickness of the conductive material of said body is greater than three skin depths of electromagnetic energy at the frequency of operation of the transmitting coil.

17. A borehole logging device, comprising:
an elongated electrically conductive pipe;
a transmitter coil and a plurality of spaced receiver coils, which transmit or receive electromagnetic energy having transverse magnetic components and transverse electric components, wound on insulating media around the axis of said pipe;

a shield for each of said transmitter and said receiver coils, each of said shields comprising a hollow closed-ended body joined at its end to said pipe and surrounding its respective coil, said body being formed of an electrically conductive material generally in the shape of a surface of revolution and having a series of substantially equally spaced slots therein, each slot extending radially outward from said pipe along a plane which passes substantially through the axis of said pipe, so as to divide said body into a number of conductive sections each of which forms a closed conductive path with said conductive pipe, whereby said conductive paths are operative to prevent passage of transverse magnetic components through said shield, but to allow transverse electric components through the slots of said shield.

18. The device as defined by claim 17, wherein the body of each of said shields is cylindrically shaped, and each slot thereof extends through the ends and sides of the cylindrical body.

19. The device as defined by claim 17, further comprising a fluid-tight insulating housing enclosing transmitter and receiver coils and said shields.

20. The device as defined by claim 18, further comprising a fluid-tight insulating housing enclosing transmitter and receiver coils and said shields.

21. The device as defined by claim 17, wherein said plurality of receiver coils comprises a spaced near pair of receiver coils and a spaced far pair of receiver coils.

22. The device as defined by claim 18, wherein said plurality of receiver coils comprises a spaced near pair of receiver coils and a spaced far pair of receiver coils.

23. The device as defined by claim 19, wherein said plurality of receiver coils comprises a spaced near pair of receiver coils and a spaced far pair of receiver coils.

24. The device as defined by claim 20, wherein said plurality of receiver coils comprises a spaced near pair of receiver coils and a spaced far pair of receiver coils.

25. The device as defined by claim 17, wherein said series of slots in each shield comprises between four and thirty-two slots.

26. The device as defined by claim 18, wherein said series of slots in each shield comprises between four and thirty-two slots.

27. The device as defined by claim 23, wherein said series of slots in each shield comprises between four and thirty-two slots.

28. The device as defined by claim 24, wherein said series of slots in each shield comprises between four and thirty-two slots.

29. The device as defined by claim 17, wherein the thickness of the conductive material of the body of each shield is greater than three skin depths of electromagnetic energy at the frequency of operation of the transmitter coil.

30. The device as defined by claim 18, wherein the thickness of the conductive material of the body of each shield is greater than three skin depths of electromagnetic energy at the frequency of operation of the transmitter coil.

31. The device as defined by claim 23, wherein the thickness of the conductive material of the body of each shield is greater than three skin depths of electromagnetic energy at the frequency of operation of the transmitter coil.

32. The device as defined by claim 24, wherein the thickness of the conductive material of the body of each shield is greater than three skin depths of electromagnetic energy at the frequency of operation of the transmitter coil.

* * * * *